(12) United States Patent
Matsunaga et al.

(10) Patent No.: US 7,140,249 B2
(45) Date of Patent: Nov. 28, 2006

(54) ANGULAR VELOCITY SENSOR

(75) Inventors: Toru Matsunaga, Miyagi (JP);
Toshiyuki Kawamura, Miyagi (JP);
Yoshinori Satoh, Saitama (JP); Takeshi Maeda, Miyagi (JP); Naoya Sasaki, Miyagi (JP); Kazuhiro Chiba, Miyagi (JP)

(73) Assignee: Sony Corporation, Tokyo (JP)

( * ) Notice: Subject to any disclaimer, the term of this patent is extended or adjusted under 35 U.S.C. 154(b) by 4 days.

(21) Appl. No.: 11/027,155

(22) Filed: Dec. 30, 2004

(65) Prior Publication Data

US 2005/0188766 A1 Sep. 1, 2005

(30) Foreign Application Priority Data

Jan. 30, 2004 (JP) ............................ P2004-024372

(51) Int. Cl.
*G01P 9/04* (2006.01)
(52) U.S. Cl. .................. 73/504.12; 73/504.14
(58) Field of Classification Search ............ 73/504.12, 73/504.04, 504.02, 504.15
See application file for complete search history.

(56) References Cited

U.S. PATENT DOCUMENTS

| | | | | |
|---|---|---|---|---|
| 5,345,822 A | * | 9/1994 | Nakamura et al. | 73/504.14 |
| 5,569,969 A | * | 10/1996 | Kasanami et al. | 310/345 |
| 5,668,316 A | * | 9/1997 | Iwai et al. | 73/493 |
| 5,765,046 A | * | 6/1998 | Watanabe et al. | 396/53 |
| 6,116,086 A | * | 9/2000 | Fujimoto | 73/504.14 |
| 6,694,813 B1 | * | 2/2004 | Koike | 73/504.14 |
| 6,907,783 B1 | * | 6/2005 | Fujimoto | 73/504.14 |

* cited by examiner

*Primary Examiner*—Helen Kwok
(74) *Attorney, Agent, or Firm*—Sonnenschein Nath & Rosenthal LLP

(57) ABSTRACT

An angular velocity sensor having a pillar-shaped vibrator and support members. The support members clamp the vibrator from above and below, at those parts where vibration nodes are formed when the vibrator vibrates. The support members mechanically support the vibrator and are electrically connected to the vibrator. The support members have an uppermost layer covered with a silver or gold coating at the electrically connected parts. Each support member has arms and connecting parts provided at the distal ends of the arms. The connecting parts have a notch each. The support members are electrically and mechanically connected with conductive adhesive provided in the notches, applied to both surfaces of the connecting part and containing silver particles as conductive filler.

5 Claims, 19 Drawing Sheets

<COMPARISON IN TERMS OF PHYSICAL PROPERTIES>

| MATERIAL | DENSITY (g/cm3) | YOUNG'S MODULE (GPa) | POISSON'S RATIO | HARDNESS HV | THERMAL EXPANSION COEFFICIENT ($10^{-7}$) | FLEXURAL STRENGTH (MPa) |
|---|---|---|---|---|---|---|
| PZT (BZ27M5 material) | 8.09 | 103 | 0.33 | 300 | 32-35 | 135 |
| AMORPHOUS CARBON | 1.46-1.60 | 30-33 | | 500 | 30 | 100-220 |
| GRAPHITE | 1.6 | 14 | | 150 | 32 | 40-90 |
| MAGNESIUM TITANATE (MgTiO3) | 3.6 | 215 | | 630 | 134 | 265 |
| CALCIUM TITANATE (CaTiO3) | 4.2 | 260 | 0.33 | 900 | 110 | 274 |
| Mn-ZnFERRITE | 4.9 | 176 | 0.326 | 650 | 114 | 170 |
| 96%ALUMINA (Al2O3) | 3.7 | 320 | 0.23 | 1370 | 72 | 350 |
| ALMINA-TITANIUM CARBIDE | 4.24 | 392 | | 2000 | 78 | 835 |
| BRASS | 8.5 | 110 | 0.35 | | 170 | |

FIG.5

VOLUME RESISTIVITIES OF CONDCUTIVE ADHESIVES

| | SILVER PASTE | NICKEL PASTE | GOLD PASTE | PALLADIUM PASTE | CARBON PASTE |
|---|---|---|---|---|---|
| VOLUME RESISTIVITY($\Omega \cdot nm$) | $1.1 \times 10^{-4}$ | $2.7 \times 10^{-1}$ | $2.1 \times 10^{-2}$ | $8.2 \times 10^{-2}$ | $1.3 \times 10^{-1}$ |

FIG.6

CONNECTION RESISTANCES THAT EACH CONDUCTIVE ADHESIVE HAS WITH VARIOUS BASES (mΩ)

| | SILVER PASTE | NICKEL PASTE | GOLD PASTE | PALLADIUM PASTE | CARBON PASTE |
|---|---|---|---|---|---|
| NICKEL BASE | 700 | 140 | 61 | 27 | 12000 |
| SILVER BASE | 1.0 | 2000 | 1.4 | 1.7 | 900 |
| GOLD BASE | 0.60 | 6.5 | 0.83 | 1.9 | 170 |
| ALUMINUM BASE | 6000 | 200 | 1200 | 10000 | 0.80 |
| COPPER BASE | 0.33 | 8.3 | 18 | 34 | 3900 |
| TIN BASE | 4.0 | 22 | 4900 | 1400 | 26000 |
| SOLDER BASE | 34 | 1800 | 1800 | 4200 | 10000 |
| PHOSPHOR BRONZE BASE | 2.9 | 23 | 520 | 1700 | 60000 |

FIG.7

SLICING OUT

| MATERIAL PLATED | INITIAL RESISTANCE (Ω) | RESISTANCE AFTER TEST (Ω) | CHANGE IN RESISTANCE (Ω) | EVALUATION | DISADVANTAGE |
|---|---|---|---|---|---|
| NO PLATING | 16 | 58 | 42 | × | UNDESIRABLE RESISTANCE |
| COPPER PLATING | 10 | 10 | 0 | ○ | LIABLE TO OXIDATION |
| GOLD PLATING | 12 | 12 | 0 | ○ | HIGH COST |
| SILVER PLATING | 13 | 13 | 0 | ◎ | |

ANGULAR VELOCITY SENSOR

BACKGROUND OF THE INVENTION

1. Field of the Invention

The present invention relates to an angular velocity sensor that is designed to detect the shaking of a video camera, the motion of an object in a virtual-reality apparatus, or directions in a car-navigation system.

This application claims priority of Japanese Patent Application No. 2004-024372, filed on Jan. 30, 2004, the entirety of which is incorporated by reference herein.

2. Description of the Related Art

Angular velocity sensors widely used in public sector are so-called gyro-type angular velocity sensors. The vibration gyro-type angular velocity sensor has a rod-shaped vibrator and a piezoelectric element. The vibrator is vibrated at a predetermined resonant frequency. The piezoelectric element detects the Coriolis force generated due to the angular velocity. The sensor determines the angular velocity from the Coriolis force.

The vibrator may be shaped like either a rectangular prism or a tuning fork. The vibrator shaped like a turning fork is supported at two vibration nodes by electrically conductive members.

FIGS. 1A, 1B and 1C illustrate a method of supporting a conventional angular velocity sensor. As shown in FIGS. 1A, 1B and 1C, the vibrator 96 of this sensor, which is a piezoelectric member, has a groove 95. The groove 95 is cut in one face of the vibrator 96 and extends in the lengthwise direction of the vibrator 96, along almost the centerline of that face. Thus, the groove 95 divides the face into two parts 91a and 91b. Connectors 40a and 41a mechanically and electrically connect conductive support members 40 and 41 to the vibrator 96. More precisely, solder or electrically conductive adhesive is applied to connect the support members 40 and 41 to the vibrator 96.

In the conventional angular velocity sensor, a drive signal is applied to the junction between the support members 40 and 41, vibrating the vibrator 96. When the vibrator 96 rotates around its longitudinal axis, a Coriolis force develops. Two signals are generated at the faces 91a and 91b of the vibrator 96. These signals are proportional to the Coriolis force and have opposite polarities. The signals are extracted from the support member 40. The angular velocity signal can be detected from the signals.

The support members 40 and 41 must have two contradicting functions. One function is to constrain the vibration nodes. The other function is to allow the vibration nodes to move to some extent. The more the vibration nodes are constrained, the smaller the vibration. Consequently, the angular velocity sensor exhibits but a low sensitivity to angular velocity. Conversely, the less the vibration nodes are constrained, the more the vibration nodes move. In this case, the angular velocity sensor has unstable operating characteristics.

In recent years, devices have grown smaller and smaller. The support members 40 and 41 therefore become shorter as long as the members 40 and 41 extend straight as shown in FIG. 1A to 1C. As a result, they support the vibrator 96 more rigidly. To support the vibrator 96 loosely, thereby to allow the vibrator 96 to vibrate freely, the support members 40 and 41 may be bent as the support members 50 and 51 shown in FIG. 2. (See, for example, Japanese Patent Application Laid-Open Publication No. H10-332379.)

Insert moldings are used to fix the support members in place, in order to enhance the productivity of angular velocity sensors and to reduce the manufacturing cost thereof. To form the insert moldings with ease, however, the upper support member 50 and the lower support member 51 must be moved to take positions that are symmetrical with respect to a vibration node.

The method that is generally employed to electrically connect the electrodes of an angular velocity sensor is soldering. The solder used is one selected as desirable in view of the use and material of the objects to be connected together. To cope with the environmental problem, any solder made of mainly metal lead is no longer used. Instead, tin-silver-copper alloys and tin-zinc alloys are now mainly used as lead-free solders. These lead-free solders are disadvantageous. They have higher melting points than the existing tin-lead solder, and their melting points cannot be lowered even if their composition is changed or additives are used in them.

The manufacturing cost of sensors should be lowered to win the recent competition in terms of price. To this end, the functional components of sensors are assembled by means of surface mounting such as reflow. Some measures should be taken not to degrade the performance and quality of any component after the component is subjected to the surface mounting. That is, the components of any sensor must withstand not only the temperature changes in normal use condition, but also the high-temperature profile while they are being mounted. This makes it difficult to design sensors.

The lead-free solders that are now used in the surface mounting to help accomplish the environmental protection have melting points higher than the tin-lead solder. Inevitably, the reflow temperature increases. As a consequence, the sensor components are exposed to a high-temperature profile. Since the lead-free solder has a high melting point, it must be used to achieve electrical connection within each component. The heat applied during the reflow may melt or loosen the junctions between the parts of the component. In some cases, an under-fill agent or the like is used, preventing the parts from moving even if the heat melts the solder. However, a component that cannot be rigidly supported, such as the vibrator, cannot be connected by the use of a lead-free solder. Such a component must be connected to the support member with an electrically conductive adhesive that would not melt after it is cured.

The electrically conductive adhesive comprises a thermosetting resin (e.g., epoxy resin) and metal filler (i.e., electrically conductive material) dispersed in the resin at high ratio. Unless the adhesive shrinks after cured, it cannot acquire electrical conductivity. In theory, the resin would not change in properties once cured, and those parts which have become electrically conductive to one another due to dielectric breakdown in the metal filler would not undergo any changes such as resistance change. In practice, however, those parts of the resin, which have undergone dielectric breakdown, are restored to the initial state because of the heat and moisture applied to them. The resistance of the junction between the components greatly changes, or the components become electrically insulated from one another. Further, the components connected with the electrically conductive adhesive have their initial resistance much changed, depending upon their materials. The product, in which the components are thus connected, may be impaired in terms of reliability.

The base of the vibrator may be made of amorphous carbon, which has good temperature characteristic. In this case, it is difficult to connect the vibrator to support members by soldering since amorphous carbon is dense and chemically stable. It is more difficult to form film on the vibrator by means of, for example, plating. Even if metal film is successfully formed on the vibrator, to provide electrodes, it will not adhere firmly enough to impart mechanical connection strength to the vibrator. No method is available, which can reliably connect the vibrator to the support members, both electrically and mechanically. This renders it hard to provide reliable angular velocity sensors.

SUMMARY OF THE INVENTION

The present invention has been made in view of the foregoing. An object of this invention is to provide a vibration gyro-type angular velocity sensor in which the vibrator is reliably supported and electrically connected, within a limited connection area.

The other objects of the invention and the advantages attained by the invention will be apparent from the following description of the embodiments of the invention.

An angular velocity sensor according to this invention comprises: a pillar-shaped vibrator which is made of piezoelectric ceramic and which has a drive electrode and detecting electrodes on a surface; and support members which clamp those parts of the vibrator, where vibration nodes are formed when the vibrator vibrates, and which mechanically support the vibrator and are electrically connected to the vibrator. Each of the support members has elongated arms extending substantially at right angles to a vibration direction of the vibrator and has connecting parts provided at the distal ends of the arms and having a notch each. The vibrator and each support member have an uppermost layer coated with silver or gold at the electrically connected parts and are electrically and mechanically connected to each other with conductive adhesive provided in the notch and on both surface of the connecting part and containing silver particles as conductive filler.

In the angular velocity sensor according to this invention, silver particles hardly move in the conductive adhesive. The dielectric breakdown therefore remains in the adhesive. Thus, the resistance in the junction will scarcely change even if external disturbance, such as heat or moisture, acts on the sensor. Further, since the silver or gold coating inherently has low resistance and chemically stable, its oxidation or degeneration is inhibited when the adhesive is cured. This lowers the electrical resistance that the junction has.

Hence, the present invention can provide an angular velocity sensor that remains stable in performance and quality, because the electrodes provided on the vibrator have high reliability.

BRIEF DESCRIPTION OF THE DRAWINGS

FIG. 5 is a table showing the physical properties of various materials for the angular velocity sensor shown in FIG. 3;

FIG. 6 is a table showing the volume resistivities of various conductive adhesives;

FIG. 7 is a table showing the connection resistances each adhesive listed in FIG. 6 has with various substrates;

FIG. 11 is a perspective view of the angular velocity sensor shown in FIG. 3, which is mounted directly on a base, without using insert-moldings or the like;

FIG. 20 is a table showing how the resistance at the junction between an electrode and a support member of the angular velocity sensor depends upon the material of the uppermost layer of the support member.

DETAILED DESCRIPTION OF THE PREFERRED EMBODIMENTS

An embodiment of the present invention will be described in detail, with reference to the accompanying drawings. Nonetheless, the invention is not limited to the embodiment. Various changes and modifications can of course be made within the scope and spirit of the present invention.

Figure 1A:
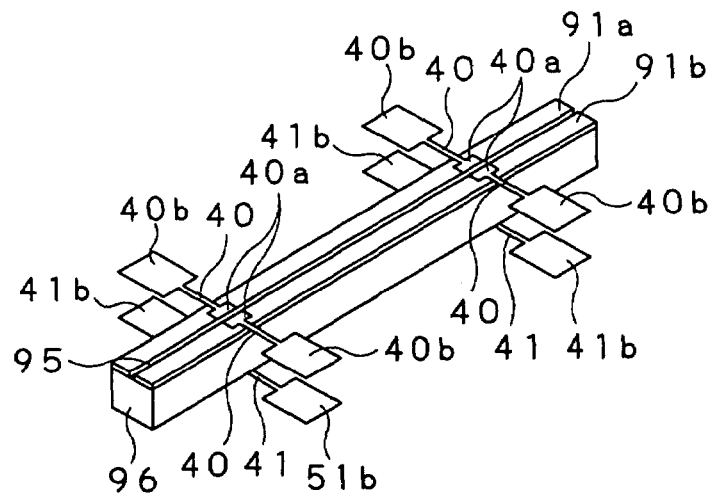
FIG. 1A is a perspective view showing the vibrator of a conventional angular velocity sensor.
Figure 1B:
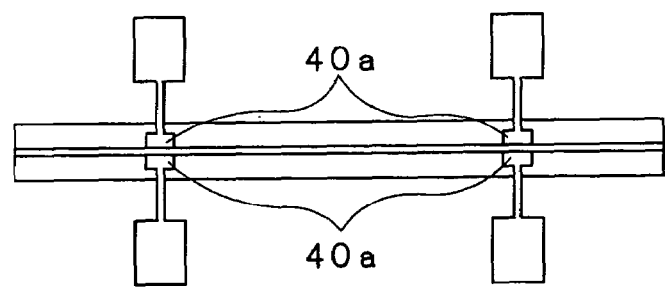
FIG. 1B is a top view depicting the vibrator.
Figure 1C:
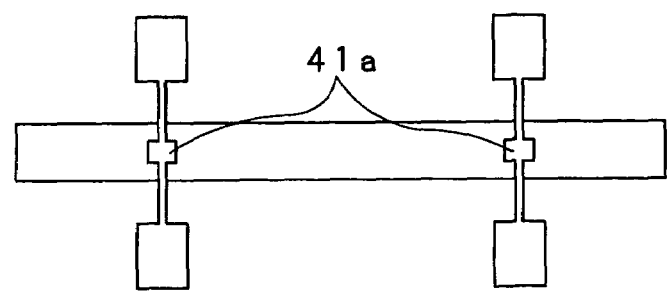
FIG. 1C is a bottom view showing the vibrator.
Figure 2A:
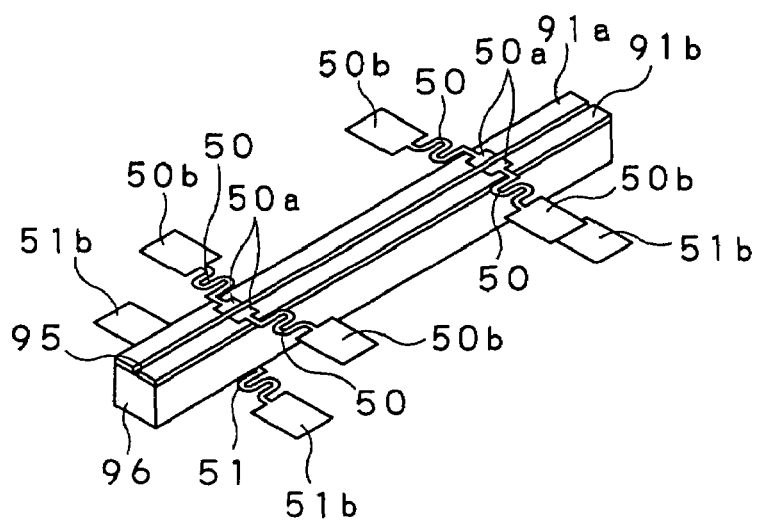
FIG. 2A is a perspective view showing the vibrator of another conventional angular velocity sensor.
Figure 2B:
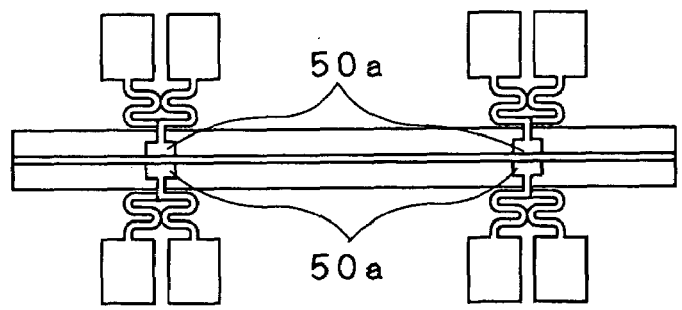
FIG. 2B is a top view depicting the vibrator of FIG. 2A.
Figure 2C:
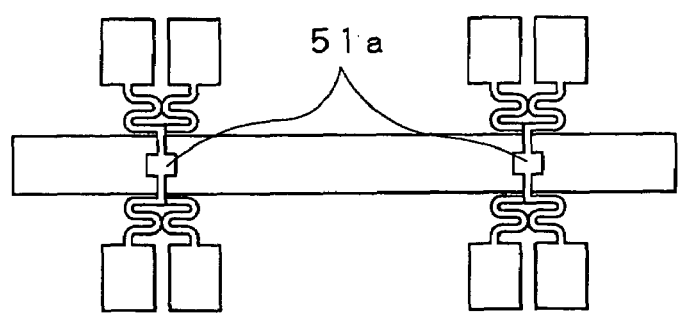
FIG. 2C is a bottom view showing the vibrator of FIG. 2A.
Figure 3:
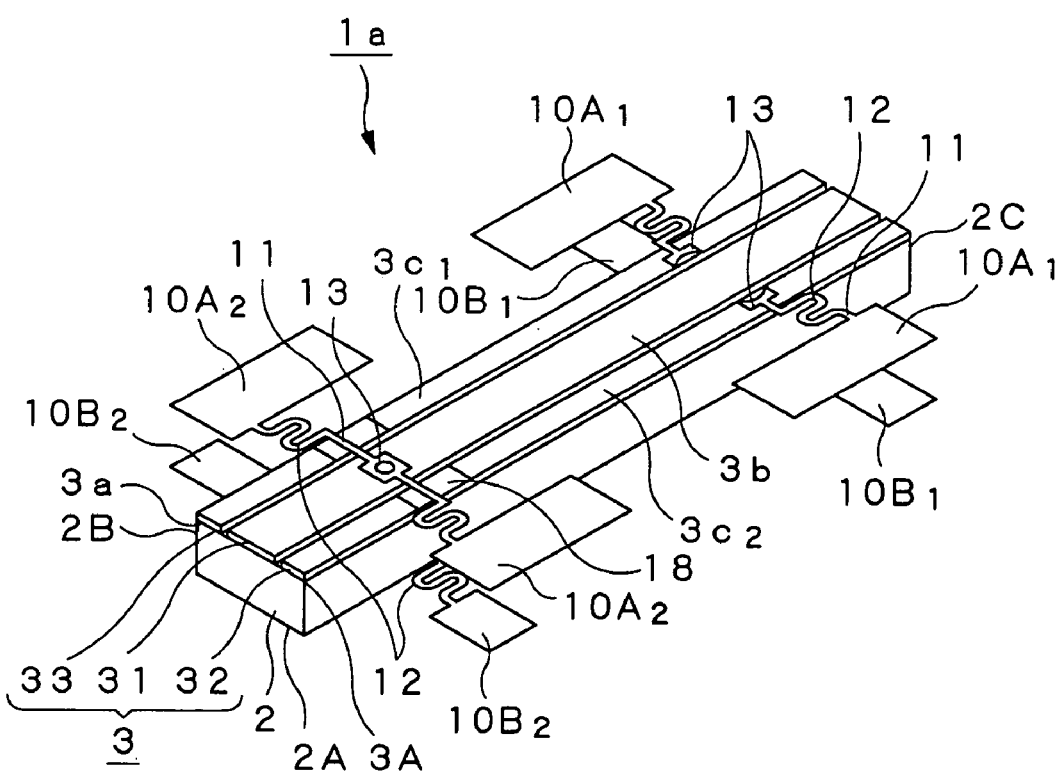
FIG. 3 is a perspective view of the vibrator provided in an angular velocity sensor according to this invention.
Figure 4:
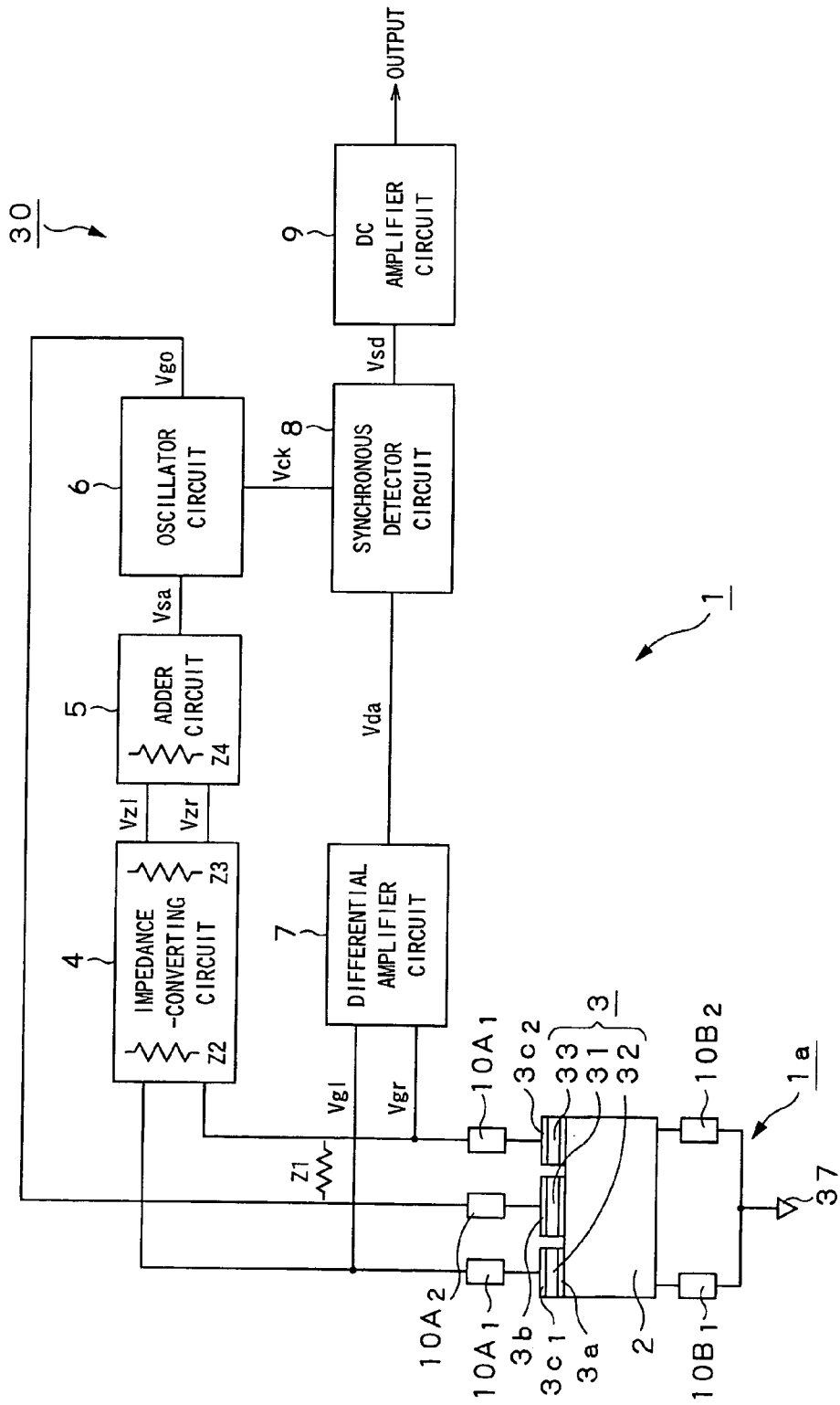
FIG. 4 is a block diagram illustrating an example of the circuit that is used in combination with the angular velocity sensor shown in FIG. 3.

FIG. 3 is a perspective view of the vibrator provided in an angular velocity sensor 1 according to this invention. FIG. 4 is a block diagram illustrating a driving-detecting circuit 30 that is used in combination with the angular velocity sensor 1.

As FIGS. 3 and 4 show, the angular velocity sensor 1 according to the present embodiment has a vibrator 1a that functions as a vibration gyro.

As FIG. 3 shows, the vibrator 1a comprises a base 2 and piezoelectric layers 3 formed on the base 2. The vibrator 1a is a rectangular prism. It therefore has a rectangular or square cross section (hereinafter referred to as "cross section"), taken along a plane perpendicular to the lengthwise direction.

Electrodes $2a$, $2b$ and $2c$ are provided on the base 2 of the vibrator $1a$ and electrically connected to one another. The electrodes $2a$ and $2b$ are formed on two major surfaces 2A and 2B, respectively, which oppose the major surfaces of the piezoelectric layers 3. The electrode $2c$ is formed on a side surface 2C continuing to the surfaces 2A and 2B. The electrode $2b$ is connected to a reference electrode $3a$. The reference electrode $3a$ is thereby electrically connected to the electrodes $2a$, $2b$ and $2c$. Thus, the base 2 and the piezoelectric layers 3 constitute the vibrator $1a$. All sides of the base 2 may be plated with conductive material, thereby to form electrodes. Instead, the base 2 may be made of electrically conductive material such as amorphous carbon. In this case, the electrodes $2a$, $2b$ and $2c$ can be dispensed with.

The piezoelectric layers 3 of the vibrator $1a$ are made of piezoelectric ceramic consisting mainly of lead zirconate titanate (PZT). Usually, it is formed by the polarization process. A reference electrode $3a$ is provided on one major surface 3A of the piezoelectric layers 3, at which the layers 3 contact the base 2. A drive electrode $3b$ is provided on another major surface 3B of the center layer 3, which opposes the major surface 3A. A pair of detection electrodes $3c_1$ and $3c_2$ are provided the major surface 3B, on the sides of the drive electrode $3b$. The detection electrodes $3c_1$ and $3c_2$ extend parallel to each other, in the lengthwise direction of the vibrator $1a$. The center piezoelectric layer 3, on which the drive electrode $3b$ is provided, functions as drive piezoelectric element 31. The other piezoelectric layers 3, on which the detection electrodes $3c_1$ and $3c_2$ are provided, function as piezoelectric detection elements 32 and 33.

The base 2 of the vibrator $1a$ is made of PZT not polarized or ceramic whose physical properties contributing to elastic deformation are equivalent to or less prominent than those of PZT, i.e., the main component of the piezoelectric layers 3. This ceramic is, for example, one consisting mainly of amorphous carbon or graphite. FIG. 5 shows the physical properties of various materials for the base 2 of the vibrator $1a$. As seen from FIG. 5, PZT, i.e., the main component of the piezoelectric layers 3, has Young's modulus of 103 GPa and thermal expansion coefficient of $32 \times 10^{-7}$ to $35 \times 10^{-7}$. In contrast, amorphous carbon has Young's modulus of 30 to 33 GPa and thermal expansion coefficient of $30 \times 10^{-7}$, and graphite has Young's modulus of 14 GPa and thermal expansion coefficient of $32 \times 10^{-7}$. Obviously, the ceramics whose main component is carbon, such as amorphous carbon or graphite, are inferior to PZT, i.e., the main component of the piezoelectric ceramic, in physical properties such as Young's modulus and thermal expansion coefficient.

The base 2 of the angular velocity sensor 1 according to this embodiment may be made of amorphous carbon, i.e., electrically conductive material.

The piezoelectric layers 3 are thinner than the base 2. For example, they are 0.2 mm thick, while the base is 0.8 mm thick.

The vibrator $1a$, which a rectangular prism, is supported by four support members $10A_1$, $10A_2$, $10B_1$ and $10B_2$. The support members $10A_1$ and $10A_2$ support the vibrator $1a$ from above, at two nodes of vibration, respectively. The support members $10B_1$ and $10B_2$ support the vibrator $1a$ from below, at two nodes of vibration, respectively. The support members $10A_1$, $10A_2$, $10B_1$ and $10B_2$ not only mechanically support the vibrator $1a$, but also are electrically connected to the vibrator $1a$.

The support members $10A_1$, $10A_2$, $10B_1$ and $10B_2$ are made of, for example, German silver, phosphor bronze, or stainless steel. The upper support members $10A_1$ and $10A_2$ and the lower support members support members $10B_1$, $10B_2$ have two bent parts 11, two arm parts 12 and two connecting parts 13 each. The bent parts 11 are bent in the lengthwise direction of the vibrator $1a$. The arm parts 12 extend at right angles to the lengthwise direction of the vibrator $1a$. The connecting parts 13 connect the arm part 12 to the vibrator $1a$ at the vibration node thereof. The connecting parts 13 of the upper support member $10A_1$ are bonded to the detecting electrodes $3c_1$ and $3c_2$, respectively, with conductive adhesive at one vibration node of the vibrator $1a$. The connecting parts 13 of the other upper support member $10A_2$ are bonded to the drive electrode $3b$, with conductive adhesive at the vibration node.

The detecting electrodes $3c_1$ and $3c_2$ have a tapered part, or short-circuiting preventing part 18 each. The short-circuiting preventing parts 18 lie below those parts of the support member $10A_2$, which straddle the detecting electrodes $3c_1$ and $3c_2$. Hence, the arm parts 12 of the support member $10A_2$ do not contact the detecting electrodes $3c_1$ and $3c_2$.

The connecting parts 13 of the lower support members $10B_1$ and $10B_2$ are bonded to the base 2 that is made of amorphous carbon, with conductive adhesive 35 at the vibration nodes of the vibrator $1a$. The base 2 electrically connects the lower support members $10B_1$ and $10B_2$ to the reference electrode $3a$.

The support members $10A_1$, $10A_2$, $10B_1$ and $10B_2$ are coupled to the vibrator $1a$. The upper most surfaces of the detecting electrodes $3c_1$ and $3c_2$ are covered with a silver or gold coating 16. Similarly, the upper most surface of the drive electrode $3b$ is covered with a silver or gold coating 26. The electrodes $3c_1$, $3c_2$ and $3b$ are bonded to the base 2 with conductive adhesive 35 that contains silver particles used as conductive filler. Thus, the vibrator $1a$ is connected to the support members $10A_1$, $10A_2$, $10B_1$ and $10B_2$, both electrically and mechanically.

FIG. 6 shows the volume resistivities of various conductive adhesives each containing conductive filler. As seen from FIG. 6, the conductive adhesive containing silver particles as conductive filler exhibits a low volume resistivity.

FIG. 7 shows the connection resistances each adhesive listed in FIG. 6 has with various substrates. As is evident from FIG. 7, the conductive adhesive 35 that contains silver or gold particles as conductive filler has a low connection resistance with silver substrates, gold substrates, and copper substrates.

The connecting parts 13, which are provided at the distal ends of the arm parts 12, respectively, are shaped like a ring or forked, each having a notch 13A.

Figure 8:
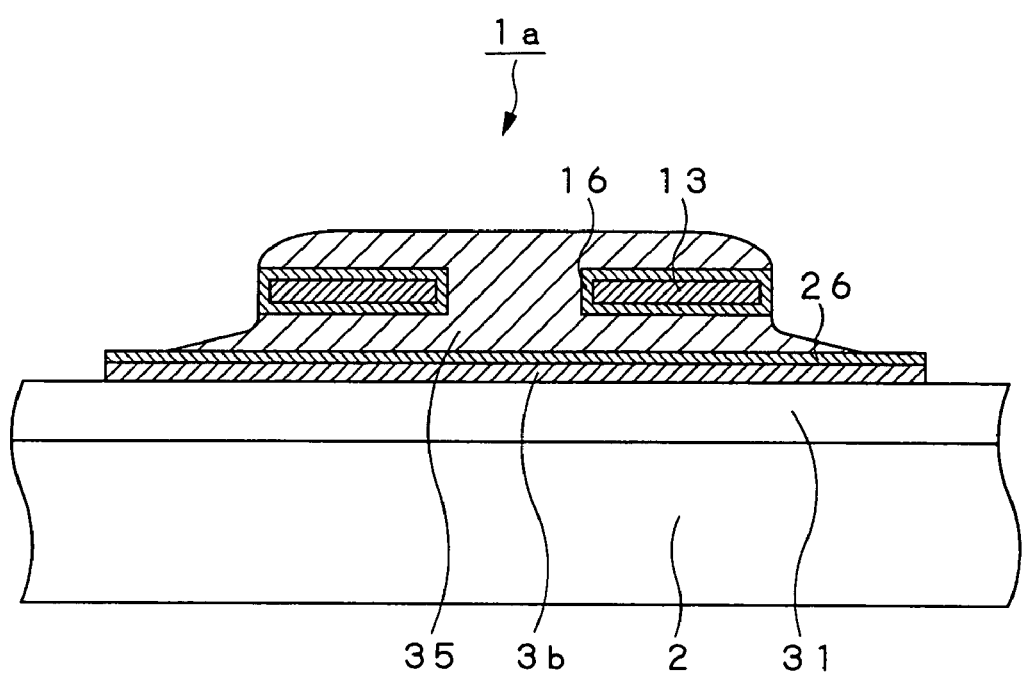
FIG. 8 is a schematic sectional view representing the junction between the electrodes and support members in the angular velocity sensor shown in FIG. 3.

The conductive adhesive flows into the notches 13A of the connecting parts 13 which are provided at the distal ends of the arm parts 12, respectively. This enhances the connection strength at which the vibrator $1a$ is connected to the support members $10A_1$ and $10A_2$. More specifically, the conductive adhesive 35 containing silver particles used as conductive filler is applied via the notch 13A on both surfaces of each connecting part 13 as is illustrated in FIG. 8. Thus applied, the conductive adhesive 35 can strengthen the electrical and mechanical connection of the support members $10A_1$ and $10A_2$ to the detecting electrodes $3c_1$ and $3c_2$ and the drive electrode $3b$.

Figures 9A, 9B, 9C, 9D, 9E:
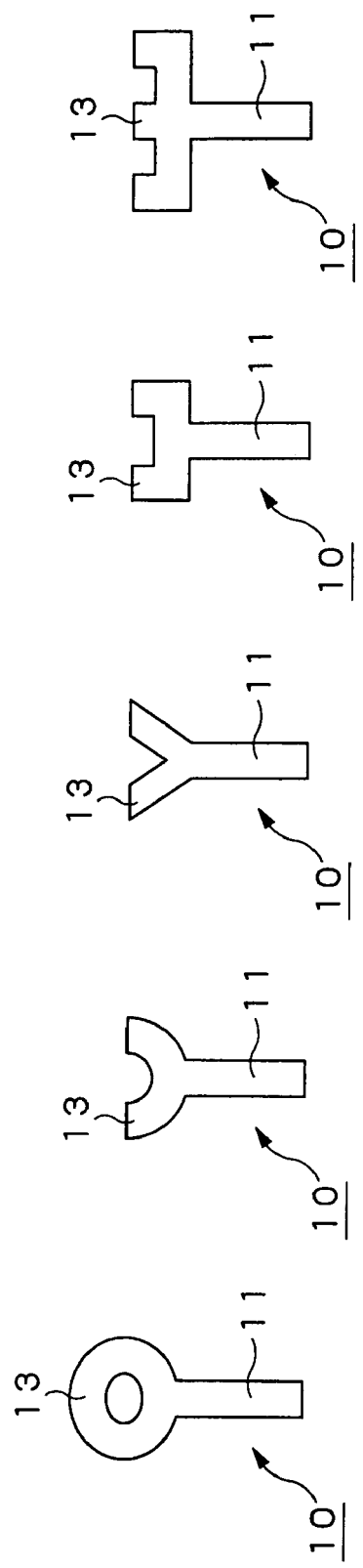
FIGS. 9A to 9E are schematic plan views of various connectors, each for connecting the vibrator to the support members in the angular velocity sensor of FIG. 3.

Each connecting part 13 may be forked. In this case, the conductive adhesive 35 can easily flow into the forked portions of the connecting part 13. This helps to achieve strong mechanical connection. When the connecting part 13 is downsized in connection with the miniaturization of the vibrator 1a, in a limited area, the connecting part 13 may be a semicircular part as shown in FIG. 9B, not a ring-shaped one as shown in FIG. 9A. In this case, the larger the diameter of the inner circle defining the part 13, the greater the mechanical strength of connection. The connection part 13 may assume any other shape than a semicircle, so long as it is forked. It may be shaped like letter Y as shown in FIG. 9C, like letter C as shown in FIG. 9D, or like a three-tined fork as shown in FIG. 9E.

The piezoelectric layers 3 of the angular velocity sensor 1 can not only vibrate, but also detect the vibration it undergoes. When the layers 3 vibrate, the vibrator 1a rotates, generating a Coriolis force. The Coriolis force is detected by the angular velocity sensor 1.

More precisely, a voltage is applied between the reference electrode 3a provided on one major surface 3A of the piezoelectric layers 3 and the drive electrode 3b provided on the other major surface 3B of the piezoelectric layers 3. The vibrator 1a that comprises the base 2 and the layers 3 laid on the base 2 is thereby vibrated, generating a Coriolis force. The piezoelectric layers 3 detect the Coriolis force. A voltage is generated between the detecting electrodes $3c_1$ and $3c_2$, both provided on the other major surface 3B of the piezoelectric layers 3. This voltage corresponds to the Coriolis force and is output as an angular-velocity detection signal.

As FIG. 4 shows, the support members $10A_1$ and $10A_2$ connect the vibrator 1a to the driving-detecting circuit 30. The connecting parts 13 of the support members $10A_1$ and $10A_2$ define the nodes of vibration of the vibrator 1a that is vibrating as long as driven by the circuit 30. The vibrator 1a undergoes resonant vibration, with its ends freely moving.

In the angular velocity sensor 1, the upper support member $10A_1$ and the lower support member $10B_1$ are provided at almost the same position, and so are the upper support member $10A_2$ and the lower support member $10B_2$. Hence, the space around the vibrator 1a is larger than otherwise. This greatly increases the efficiency of assembling the angular velocity sensor 1 and ultimately lowers the manufacturing cost of the sensor 1. In addition, this helps to reduce the size of the angular velocity sensor 1. Moreover, circuit components, such as chips, can be arranged in that space, making it possible to provide an integrated-circuit device. The support members $10A_1$ and $10B_1$ oppose each other and are bent in the same direction. Likewise, the support members $10A_2$ and $10B_2$ oppose each other and are bent in the same direction. No rotation moments are therefore applied at the node of vibration. Thus, the angular velocity sensor 1 is more resistant to impacts than in the case where the support members $10A_1$ and $10B_1$ are bent in the opposite directions and the support members $10A_2$ and $10B_2$ are bent in the opposite directions.

Figure 10:
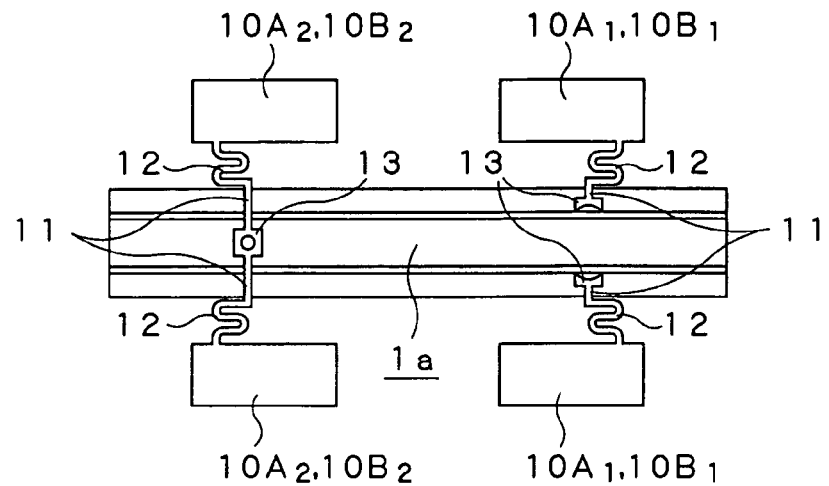
FIG. 10 is a top view of the vibrator incorporated in the angular velocity sensor of FIG. 3.
Figure 11:
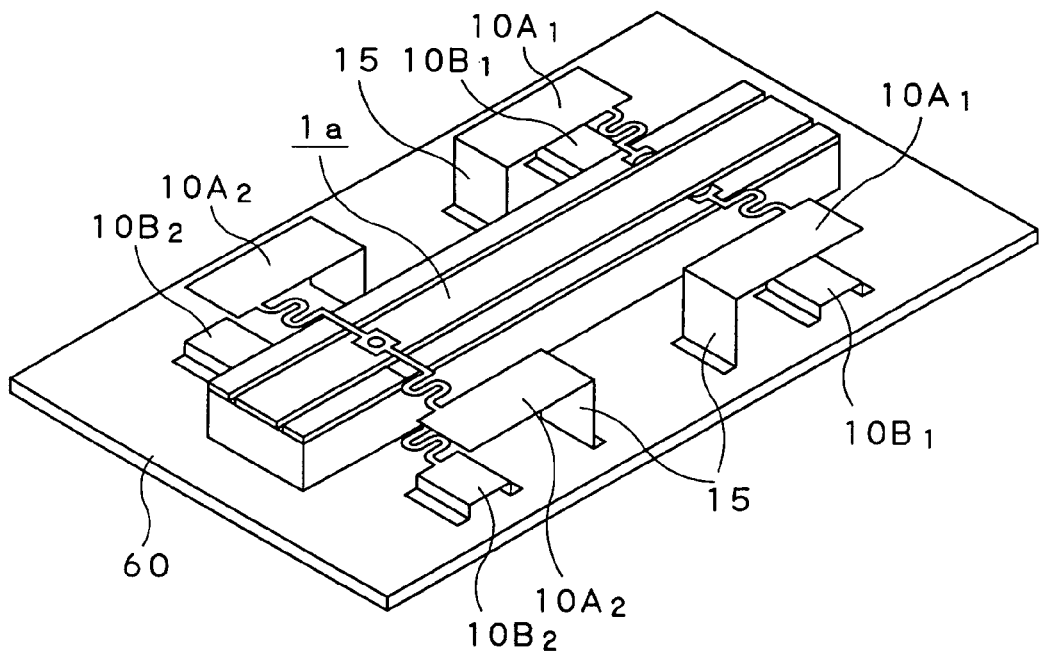

As FIG. 10 depicts, the support members $10A_1$ and $10B_1$ overlap in the vertical direction, and the support members $10A_2$ and $10B_2$ overlap in the vertical direction. The connecting parts 13 of the upper support members $10A_1$ and $10A_2$ may be expanded. Then, the upper support members $10A_1$ and $10A_2$ can be easily connected to insert moldings. As illustrated in FIG. 11, the upper support members $10A_1$ and $10A_2$ may be bent and may have connection parts 15. In this case, the upper support members $10A_1$ and $10A_2$ can be fastened to the base 60, without using any fastening parts such as insert moldings.

As FIG. 4 shows, the driving-detecting circuit 30 comprises an impedance-converting circuit 4, an adder circuit 5, an oscillator circuit 6, a differential amplifier circuit 7, a synchronous detector circuit 8, and a DC amplifier circuit 9. The impedance-converting circuit 4 is connected by the support member $10A_1$ to the detecting electrodes $3c_1$ and $3c_2$ of the vibrator 1a. The differential amplifier circuit 7 is connected by the support member $10A_1$ too, to the detecting electrodes $3c_1$ and $3c_2$ of the vibrator 1a. The adder circuit 5 is connected to the impedance-converting circuit 4. The oscillator circuit 6 is connected to the adder circuit 5. The synchronous detector circuit 8 is connected to the oscillator circuit 6 and the differential amplifier circuit 7. The DC amplifier circuit 9 is connected to the synchronous detector circuit 8. The output of the oscillator circuit 6 is supplied to the drive electrode 3b through the support member $10A_2$. The reference electrode 3a of the vibrator 1a is electrically connected to the base 2 that is made of amorphous carbon. The reference electrode 3a is connected to a reference potential 37 by the lower support members $10B_1$ and $10B_2$.

In the driving-detecting circuit 30, the impedance-converting circuit 4, adder circuit 5 and oscillator circuit 6 constitute a self-excitation oscillator circuit. The self-excitation oscillator circuit drives the vibrator 1a. The vibrator 1a vibrates in a direction perpendicular to the plane in which the piezoelectric element 31 are formed. Note that the element 31 are used as drive strips.

The vibrator 1a is driven when the output Vgo of the oscillator circuit 6 is applied to the piezoelectric element 31. The piezoelectric detection elements 32 and 33 of the vibrator 1a generate voltages Vgl and Vgr, respectively. The voltages Vgl and Vgr are input, as Vzl and Vzr, to the adder circuit 5 via the impedance-converting circuit 4. The adder circuit 5 generates voltage Vsa, which is the sum of the voltages Vzl and Vzr. The voltage Vsa is fed back to the oscillator circuit 6.

When the vibrator 1a is rotated around its longitudinal axis in this condition, it generates a Coriolis force. The Coriolis force changes the direction of bending. As a result of this, the voltages Vgl and Vgr generated by the piezoelectric detection elements 32 and 33 differ from each other. The differential amplifier circuit 7 detects Vgl–Vgr, i.e., the difference between the outputs of the piezoelectric elements 32 and 33. The differential amplifier circuit 7 generates an output Vda. At this time, the signals for driving the vibrator 1a are the outputs of the piezoelectric detection elements 32 and 33 and are identical in phase and magnitude. Thus, the differential amplifier circuit 7 cancels out the signals for driving the vibrator 1a. The signals corresponding to the Coriolis force are signals Vcl and Vcr generated by the piezoelectric elements 32 and 33, respectively, and are inverse in phase and identical in magnitude. Hence, the output Vda of the differential amplifier circuit 7 is proportional to Vcl–Vcr.

The synchronous detector circuit 8 detects the output Vda of the differential amplifier circuit 7. The output Vda of the circuit 7 is thereby converted to a DC signal Vsd. More specifically, the synchronous detector circuit 8 performs full-wave rectification on the output Vda of the differential amplifier circuit 7 at the frequency of the clock signal Vck that the oscillator circuit 6 has output in synchronism with the drive signal. The synchronous detector circuit 8 then integrates the components of the output Vda thus rectified, thus generating the DC signal Vsd. The DC amplifier circuit 9 performs DC amplification on the DC signal Vsd, generating an angular-velocity signal that represents the angular velocity.

The impedance-converting circuit 4 receives high impedance Z2 and generates low impedance Z3. In other words, the circuit 4 isolates the impedance Z1 between the piezoelectric elements 32 and 33 from the impedance Z4 between the inputs of the adder circuit 5. Without the impedance-converting circuit 4, the impedance Z1 and the impedance Z4 could not be isolated from each other. Then, the output difference between the piezoelectric elements 32 and 33 would be smaller or Z4/(Z1+Z4) times the initial value.

The impedance-converting circuit 4 converts only the impedance between the input and output, and does not influence the magnitude of the signal. Hence, the signal Vg1 output from the piezoelectric element 32 and one signal Vz1 output from the circuit 4 have the same magnitude, and the signal Vgr output from the piezoelectric element 33 and the other signal Vzr of the circuit 4 have the same magnitude. The signal corresponding to the Coriolis force is canceled in the output signal Vsa of the adder circuit 5. The magnitude of the signal Vsa therefore becomes the sum of the signals that the piezoelectric elements 32 and 33 generate when they do not move. The adder circuit 5, vibrator 1a, impedance-converting circuit 4 and oscillator circuit 6 constitute a positive feedback loop. The positive feedback loop functions as an oscillator circuit, which excites itself at the resonant frequency of the vibrator 1a.

The power supply of the driving-detecting circuit 30 may be supplied with an output voltage of a switching regulator, which has an oscillation frequency of hundreds of kilohertz or more. In this case, a power-supply noise influences the two outputs of the impedance-converting circuit 4. If the noise influences the outputs Vz1 and Vzr of the circuit 4 to different degrees, a potential difference will be generated between the outputs Vz1 and Vzr. The adder circuit 5 adds the outputs Vz1 and Vzr of the impedance-converting circuit 4, each containing noise, and generates a sum signal. The sum signal is input to the vibrator 1a through the oscillator circuit 6.

The output Vgo of the oscillator circuit 6 contains the signal noise, too. Nonetheless, it does not contain any component other than the component corresponding to the resonance frequency of the vibrator 1a. This is because the vibrator 1a operates in the same way as a band-pass filter. Hence, the signal noise is removed from the outputs of the piezoelectric elements 32 and 33 in the driving-detecting circuit 30. The output Vda of the differential amplifier circuit 7 does not contain signal noise, either. That is, the output Vda is not influenced by the power-supply noise.

Figure 12A:
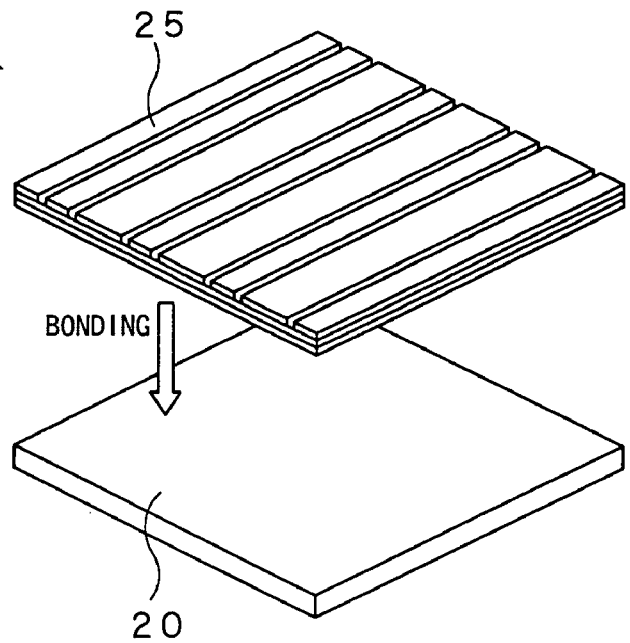
FIGS. 12A to 12C are perspective views, explaining a method of manufacturing the angular velocity sensor shown in FIG. 3.
Figure 12B:
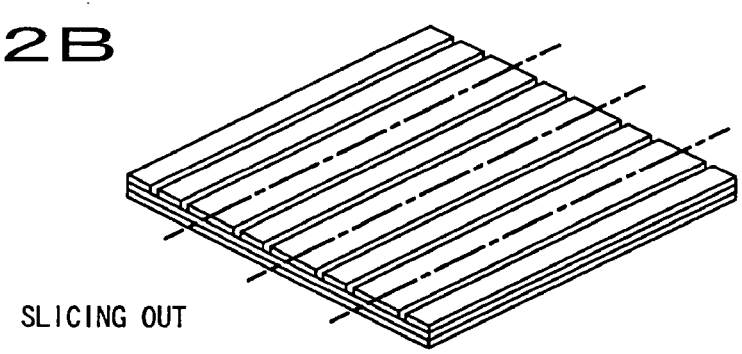
Figure 12C:
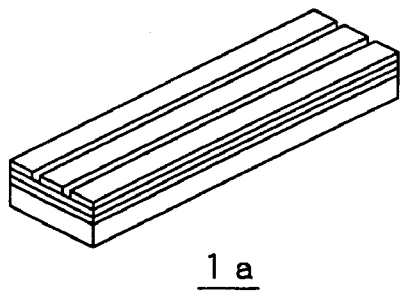

In this embodiment, the angular velocity sensor 1 has detecting electrodes $3c_1$ and $3c_2$ and a drive electrode $3b$ that are arranged in the same plane. The vibrator 1a can therefore be manufactured as will be explained with reference to FIGS. 12A to 12C. A wafer 20 is prepared, which will be processed to provide the base 2. A piezoelectric wafer 25 is prepared, which is electroplated on both sides and therefore has electrodes. As shown in FIG. 12A, the wafer 25 is bonded to the wafer 20, forming a two-layer substrate. As FIG. 12B shows, the two-layer substrate is cut into rectangular prisms. Thus, vibrator 1a is manufactured, as is illustrated in FIG. 12C. The vibrator 1a thus manufactured can be very small and can have high dimensional precision. Further, it can be mass-produced. Since the piezoelectric layer is not bonded to the base, it will not be displaced. Moreover, since the base is made by a cutting process, like the piezoelectric layers, the vibrator can be easily manufactured by cutting the two-layer substrate composed of the base wafer 20 and the piezoelectric wafer 25.

The angular velocity sensor 1 can be manufactured, without performing difficult processes required in manufacturing the conventional angular velocity sensor, such as the process of bonding piezoelectric elements to a vibrator made of elastic metal and the process of printing electrodes on curved surfaces.

In the angular velocity sensor 1, the base 2 bonded to the reference electrode 3a formed on one major surface 3A of the piezoelectric layers 3 is made of electrically conductive material. Instead, an electrically insulating base 2 may be used, which is plated with electrically conductive material. In this case, an electrode is formed on at least one side of the base, which joints the major surfaces 2A and 2B, and is connected to the reference electrode 3a. Then, a drive electric field can be efficiently applied to the piezoelectric layers 3. This helps to enhance the sensitivity of the angular velocity sensor 1.

The smaller the angular velocity sensor 1, the more difficult it may be to maintain the dimensional precision. Nevertheless, the sensor 1 can attain high dimensional precision by the use of the micro-processing technique that is established in the manufacture of LSIs and heads. Since the sensor 1 has high dimensional precision, the oscillation frequency of its vibrator can be adjusted by a simple method.

Since a self-excitation oscillator circuit drives the vibrator 1a, the angular velocity sensor 1 can have a simple circuit configuration and can yet detect angular velocity at high precision.

The angular velocity sensor 1 is therefore a self-excited type. Hence, it would not have its sensitivity decreased due to the changes of the ambient temperature, unlike angular velocity sensors that are excited by an external device.

Figure 13:
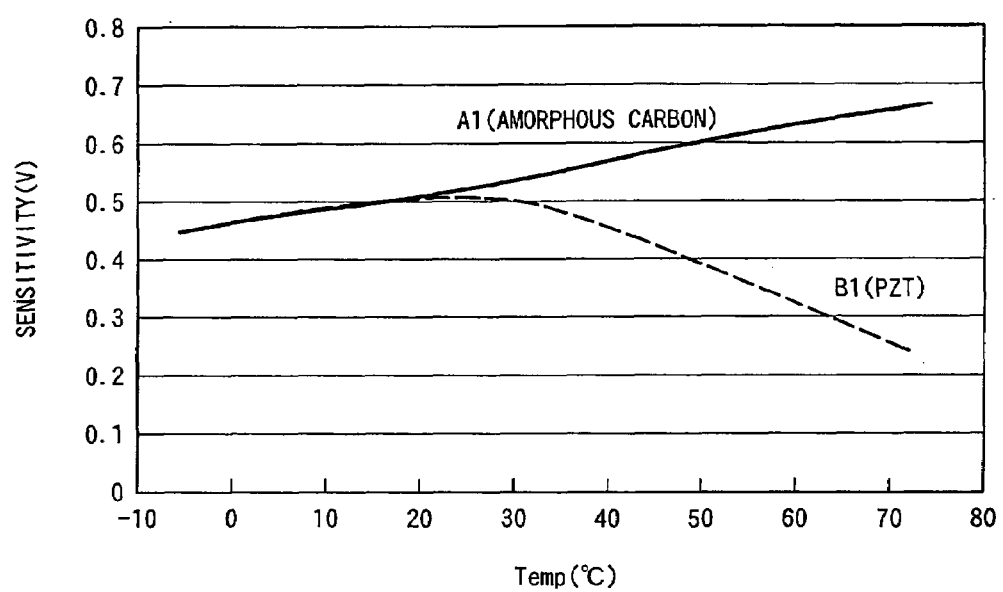
FIG. 13 is a graph representing how the sensitivity of the angular velocity sensor of FIG. 3 actually changes with the ambient temperature.

FIG. 13 shows how the sensitivity of the angular velocity sensor 1 actually changes with the ambient temperature. In FIG. 13, curve A1 indicates the temperature characteristic of the sensor 1, and curve B1 indicates the temperature characteristic of an angular velocity sensor whose base is made of PZT. Note that. the base 2 of the sensor 1 is made of amorphous carbon, whose Young's modulus and thermal expansion coefficient are equal to or smaller than those of PZT, i.e., the main component of the piezoelectric ceramic that is the material of the piezoelectric layers 3.

As clearly seen from FIG. 13, the vibrator 1a is hardly influenced by the ambient temperature. This is because its base 2 is made of amorphous carbon, i.e., material whose Young's modulus and thermal expansion coefficient are equal to or smaller than those of PZT that is the main component of the piezoelectric ceramic (i.e., material of the piezoelectric layers 3).

Figure 14:
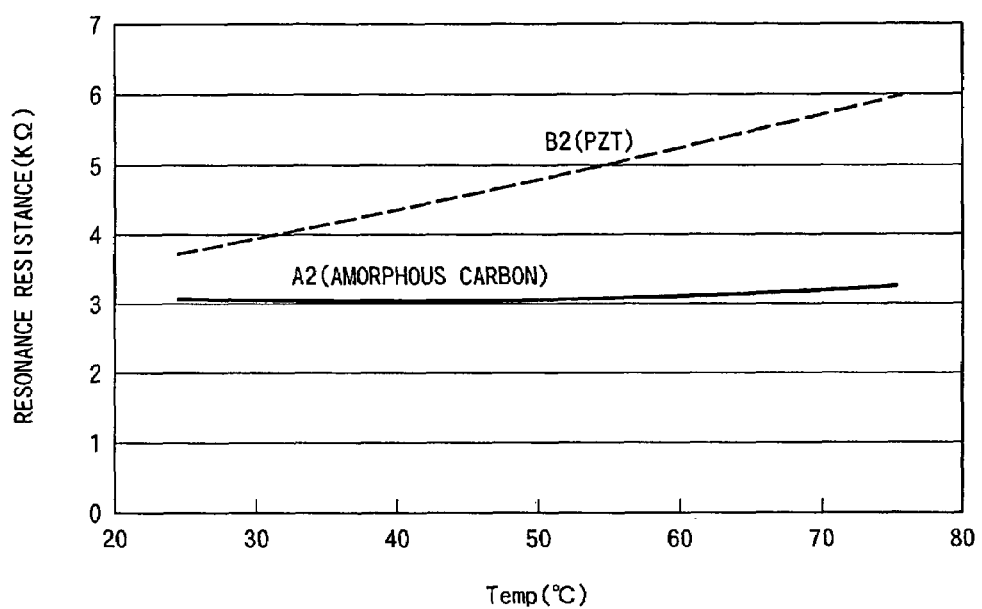
FIG. 14 is a graph showing how the resonant resistance and sensitivity of the angular velocity sensor of FIG. 3 depend upon temperature.

As can be understood from curve A2 shown in FIG. 14, the resonant resistance of the vibrator 1a changes less with the ambient temperature than that of a vibrator whose base is made of PZT changes (see curve B2). As a result, the sensitivity of the angular velocity sensor 1 changes but a little with the ambient temperature. As curve A2 indicates, the sensitivity changes almost in proportion to the ambient temperature. Hence, the sensitivity can be easily corrected.

Figure 15:
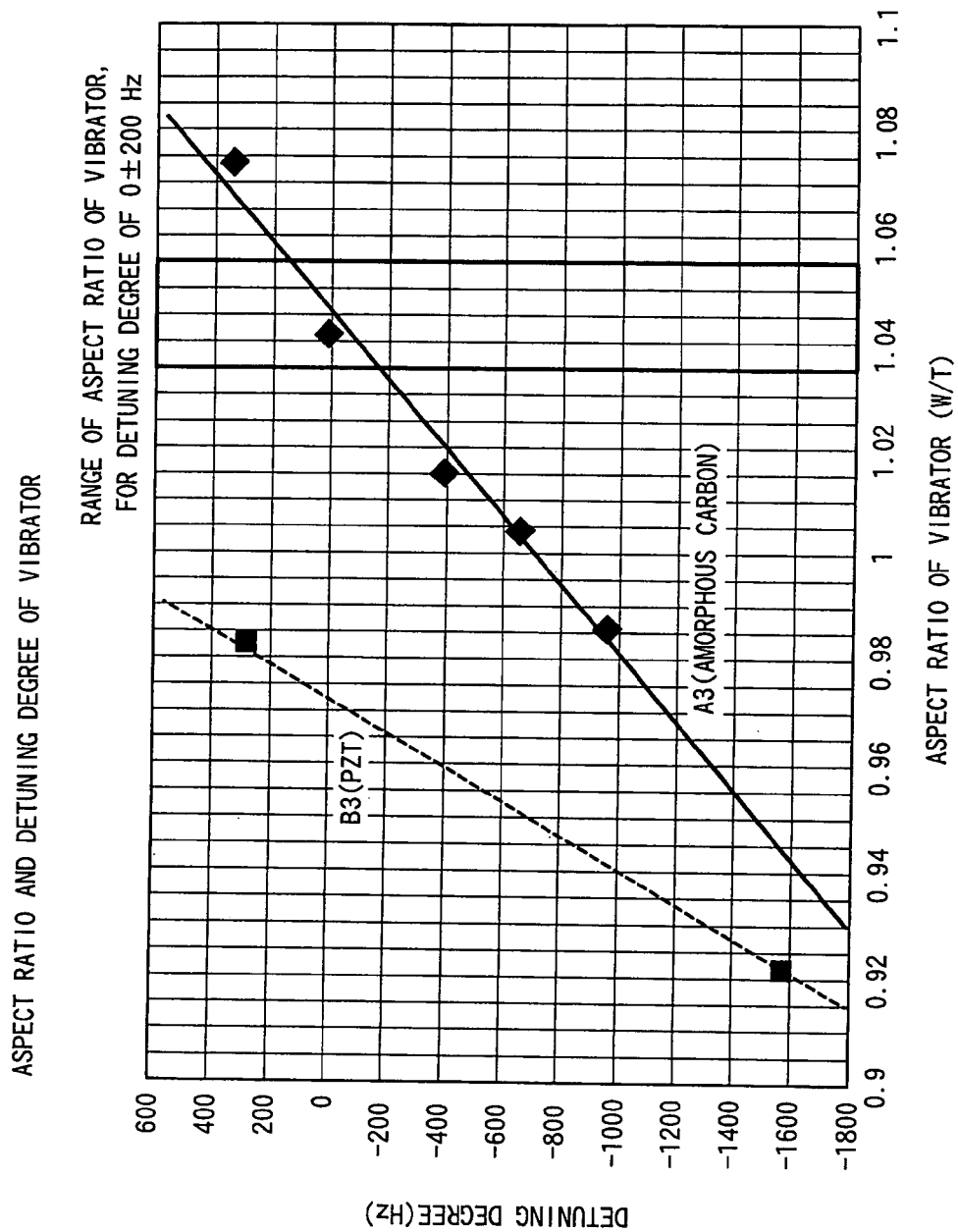
FIG. 15 is a graph illustrating the relation between the sectional aspect ratio and detuning degree of the vibrator used in the angular velocity sensor of FIG. 3.

FIG. 15 represents the relation between the sectional aspect ratio and detuning degree of the vibrator 1a incorporated in the angular velocity sensor 1. The term "detuning degree" means the difference between the frequency of vertical resonance and the frequency of horizontal resonance. The lower the detuning degree, the hither the sensitivity of the angular velocity sensor 1.

In FIG. 15, line A3 indicates the characteristic of the sensor 1, and curve B3 indicates the characteristic of an angular velocity sensor whose base 2 is made of PZT. Recall that the base 2 of the sensor 1 is made of material (i.e., amorphous carbon), whose physical properties, such as Young's modulus and thermal expansion coefficient, are equal to or smaller than those of PZT, i.e., the main component of the piezoelectric ceramic that is the material of the piezoelectric layers 3.

In the framed region of FIG. 15, the sectional aspect ratio of the vibrator 1a, i.e., the ratio of width to thickness, ranges from 1.030 to 1.055. In this region, the detuning degree is almost 0, or 0±200 Hz. Only if the sectional aspect ratio is confined to this region, i.e., from 1.030 to 1.055, the detuning degree can be adjusted, both readily and reliably.

Figure 16:
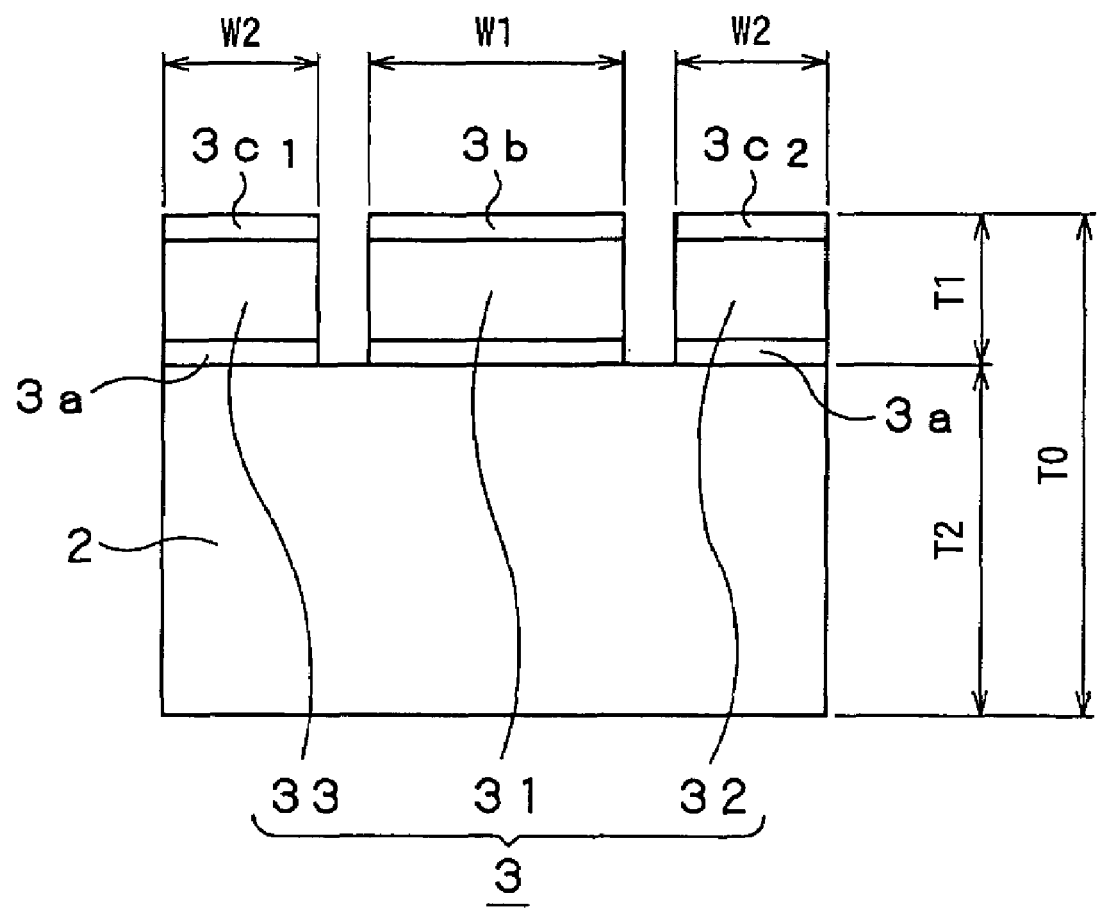
FIG. 16 is a sectional view of the vibrator provided in the angular velocity sensor of FIG. 3.

As FIG. 16 depicts, the drive electrode 3b may have a width W1, and the detecting electrodes $3c_1$ and $3c_2$ may have another width W2. The difference in width between the drive electrode 3b and the detecting electrodes $3c_1$ and $3c_2$ can optimize the detecting characteristic of the angular velocity sensor 1. In other words, the driving efficiency can be adjusted, merely by adjusting the shape and size of the drive electrode 3b, and the efficiency of detecting angular velocities can be adjusted, merely by adjusting the shape and size of the detecting electrodes $3c_1$ and $3c_2$.

Figure 17:
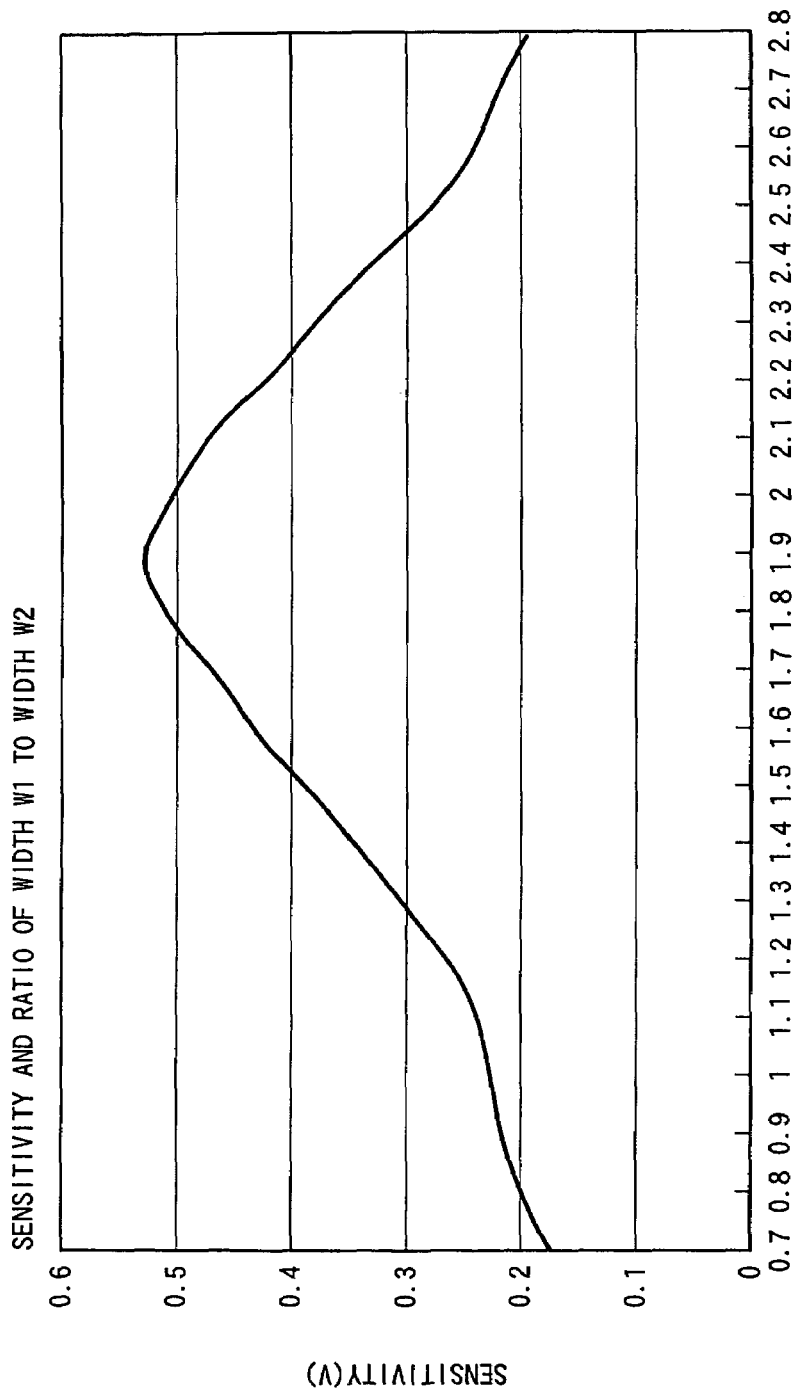
FIG. 17 is a graph representing the relation between the sensitivity and electrode-width ratio of the angular velocity sensor shown in FIG. 3.

FIG. 17 represents the relation between the sensitivity and electrode-width ratio of the angular velocity sensor 1, which is observed when the ratio of width W1 to width W2 is changed from 1 to 2.8.

As clearly seen from FIG. 17, the angular velocity sensor 1 exhibits sensitivity equal to or more than that in the case where W1/W2=1, in the range of 1<W1/W2≦2.6. Particularly, in the range of 1.8<W1/W2≦2.0, the sensor 1 exhibits sensitivity at least twice as great as in the case where W1/W2=1.

Figure 18:
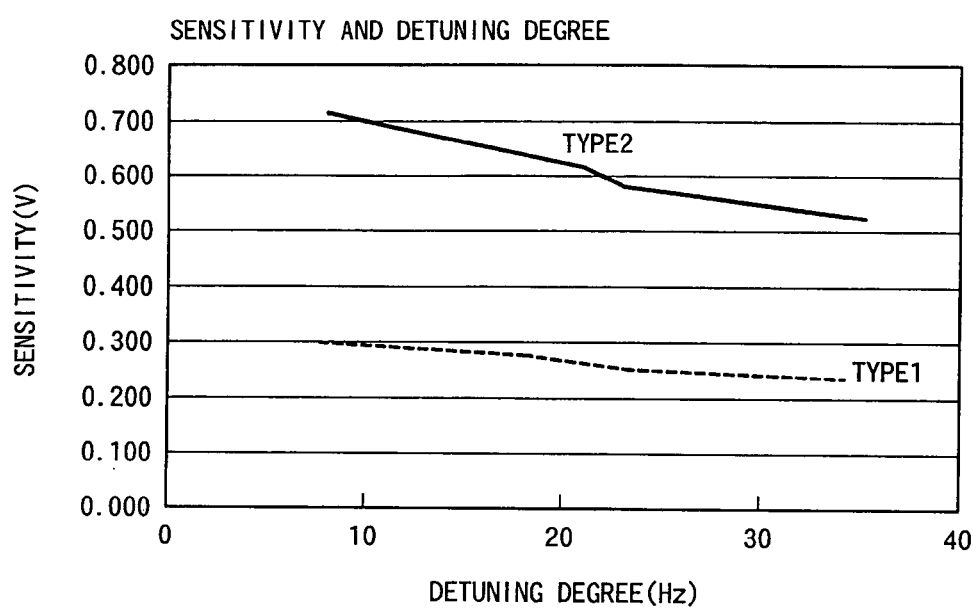
FIG. 18 is a graph showing the relation between the sensitivity and detuning degree of the vibrator used in the angular velocity sensor of FIG. 3.

FIG. 18 shows the relation between the sensitivity and detuning degree of the angular velocity sensor 1.

The detuning degree is the difference between the frequency of vertical resonance and the frequency of horizontal resonance. The lower the detuning degree, the hither the sensitivity of the angular velocity sensor 1. As FIG. 18 shows, line TYPE1 indicates how the sensitivity changes with the detuning degree when W1/W2=1. Line TYPE2 indicates how the sensitivity changes with the detuning degree when W1/W2=1.9. As evident from FIG. 18, the sensitivity is much higher when W1/W2=1.9 than when W1/W2=1, over all range of the detuning degree.

Figure 19:
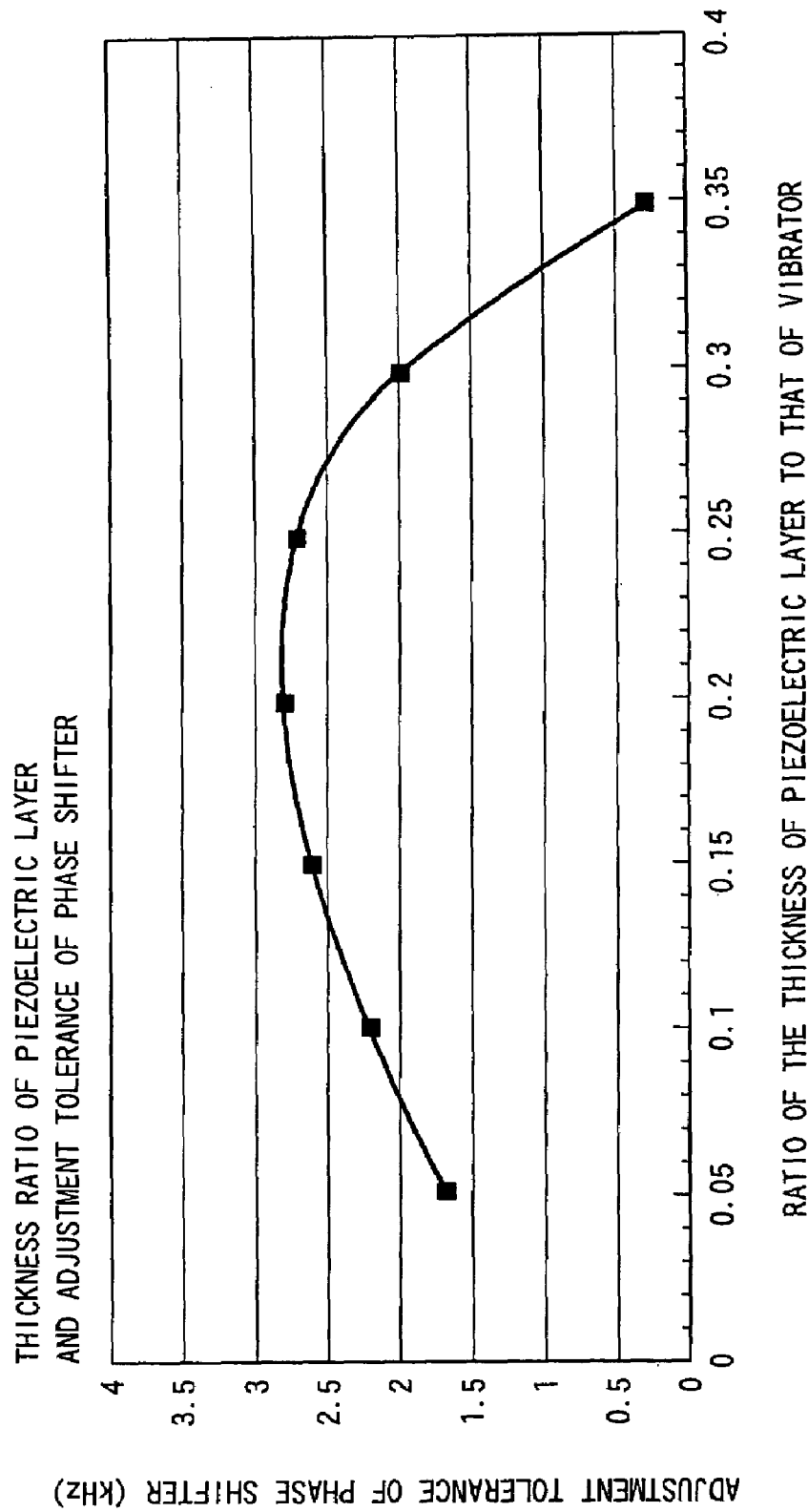
FIG. 19 is a graph showing how the oscillation frequency of the vibrator and the adjustment tolerance of a phase shifter actually changes with the thickness ratio between the piezoelectric element and the vibrator.

In the angular velocity sensor 1 according to this embodiment, the thickness T1 of the piezoelectric layers 3 is smaller than the thickness T2 of the base 2. For example, the thickness T1 of the layers 3 is 0.2 mm, while the thickness T2 of the base 2 is 0.8 mm. The oscillation frequency of the vibrator 1a and the adjustment tolerance of the phase shifter provided in the drive circuit were measured, while the ratio of the thickness T1 of the layers 3 to thickness T0 of the vibrator 1a was changed. The results were as shown in FIG. 19. As seen from FIG. 19, the resonant resistance and the oscillation frequency can fall within a specific range, and the drive circuit that causes the vibrator 1a to undergo self-excitation can acquire a sufficient phase margin, if the ratio of thickness T1 of the layers 3 to the thickness T0 of the vibrator ranges from 0.14 to 0.27, or if the thickness T0 of the vibrator 1a is 0.9 mm to 1.1 mm and the thickness T1 of the layers 3 is 0.15 mm to 0.25 mm. Moreover, the detuning degree and the oscillation frequency can be adjusted to prescribed values by decreasing the ratio of the frequency change to the dimensional change of the vibrator 1a.

As specified above, the upper support members $10A_1$ and $10A_2$, detecting electrodes $3c_1$ and $3c_2$ and drive electrode 3b have their uppermost layer plated with silver or gold, in the angular velocity sensor according to the present embodiment. The uppermost layers are adhered with the conductive adhesive 35 contains silver particles as conductive filler.

In the angular velocity sensor a according to this embodiment, a metal layer, such as a nickel layer or a copper layer, may be formed to enhance the affinity with the base material, i.e., PZT or metal. In this case, a silver film or a gold film may be formed on the metal layer. The method of providing the film is not limited to plating, so long as sufficient adhesion and appropriate film quality are obtained. Thus, the film may be formed by sputtering or vapor deposition. For example, an under layer of nickel, having a thickness of 1 μm, may be formed on the PZT and a finishing film of silver, having a thickness of 1 μm, may be plated on the nickel film. The metal spring is a German silver layer having a thickness of 100 μm. The under layer and finishing layer for the spring are a copper layer having a thickness of 1 μm and a sliver layer plated and having a thickness of 1 μm, respectively. If the base is made of amorphous carbon, the electrode 3b can be dispensed with, and it suffices to coat the surface directly with the epoxy-based conductive adhesive 35 and to connect the support members of the type described above to the base.

As in the angular velocity sensor 1 according to this embodiment, the connecting structure is one adapted to the conductive adhesive 35 containing silver particles as conductive filler. The electrical affinity between the adhesive and the parts connected together with the adhesive therefore increases, providing more stable connection than the parts are connected in other conditions. If the uppermost layers of either part to be adhered is coated with silver, both the adhesive and the part contain silver. In this case, the adhesive and the part attain chemical equilibrium, and no substances hardly move through the contact between the adhesive and the part. Further, the silver or gold existing on the surface of the part act as a barrier that prevents the migration of silver particles in the conductive adhesive, even if heat and water acts upon the silver particles. Since the silver particles do not move in the conductive adhesive, the dielectric breakdown remains in the adhesive, the resistance hardly changes at the junction between the adhesive and the part even if the junction is exposed to outer disturbances such as heat and moisture. Since the silver or gold coating inherently has low resistance and chemically stable, its oxidation or degeneration is inhibited when the adhesive is cured. This lowers the electrical resistance that the junction has.

Amorphous carbon is a resin made from an aromatic compound used as starting material. It has high affinity, particularly with epoxy resin. Amorphous carbon scarcely reacts with silver and other metal elements, because it is electrically conductive, dense and chemically stable. Even if external disturbance, such as heat or water, acts on amorphous carbon, silver particles will hardly move in the conductive adhesive. So long as no substances migrate in the adhesive, the dielectric breakdown remains in the adhesive. Thus, no resistance changes will occur.

Samples were prepared, each having two metal springs of the same shape and the same material, bonded to each other with conductive adhesive. The samples are different only in the material of the uppermost layer of either metal spring. The resistance at the function between the connection terminals of each sample was measured. The results were as shown in FIG. 20.

Outer disturbances were applied to each sample, by holding the sample at 85° C. and 95% Rh for 120 h in the high-temperature/humidity test, and by passing the sample twice through a continuous furnace in the reflow test. Note that the furnace is one having a temperature profile of 230° C. or more for 30 seconds, with the peak temperature of 250° C. The samples were evaluated, not immediately after the tests but after leaving them in a normal-temperature, normal-humidity atmosphere for 24 h or more. As seen from FIG. 20, the resistance was initially low and changed but a little after the application of outer disturbances such as high temperature, high humidity and reflow process, in any sample wherein the uppermost layer of either metal spring is made of silver or gold. In a sample wherein the uppermost layer of either metal spring is made of nickel or German silver, the resistance was initially low, but greatly changed due to the outer disturbances, adversely influencing the performance of the device.

What is claimed is:

1. An angular velocity sensor comprising:
   a pillar-shaped vibrator which is made of piezoelectric ceramic and extends along a longitudinal direction;
   at least one drive electrode and detecting electrodes extending along the longitudinal direction on one major surface of the piezoelectric ceramic with the drive electrode positioned between the detecting electrodes; and
   support members which hold the vibrator at those points along the vibrator where vibration nodes are formed when the vibrator vibrates, mechanically support the vibrator and are electrically connected to the vibrator, wherein,
   each of the support members has an elongated arm extending substantially at right angles to the vibrator and a vibration direction of the vibrator and is connected at a distal end thereof to the vibrator and has connecting parts provided at the distal end and a notch;
   the vibrator and each support member has an uppermost layer coated with silver or gold at the electrically connected parts and are electrically and mechanically connected to each other with conductive adhesive provided in the notch and on both surface of the connecting part and containing silver particles as conductive filler; and
   the arms of the support members lying above and below each vibration node, respectively, have bent portions which are bent in the same direction with respect to the longitudinal direction of the vibrator.

2. The angular velocity sensor according to claim 1, wherein the arms of the support members lying above and below each vibration node, respectively, have bent portions which are bent in the same direction with respect to the longitudinal direction of the vibrator, and connecting parts which are connected to the vibrator.

3. The angular velocity sensor according to claim 1, wherein the vibrator comprises a base and a piezoelectric layer laid on the base, the piezoelectric layer is made of piezoelectric ceramic consisting mainly of lead zirconate titanate (PZT), and the base is made of material other than PZT, the physical properties of which, such as Young's modulus and thermal expansion coefficient, are equal to or smaller than those of PZT.

4. The angular velocity sensor according to claim 3, wherein the base is made of amorphous carbon.

5. The angular velocity sensor according to claim 3, further comprising:
   a reference electrode which is formed on another major surface of the piezoelectric layer and which is connected to a reference potential,
   wherein,
   the at least one drive electrode receives a signal that cause the vibrator to vibrate,
   the detecting electrodes extend parallel to each other with the at least one drive electrode therebetween, the detecting electrodes providing a signal that corresponds to a Coriolis force generated by vibrations of the vibrator, and
   a voltage applied across the at least one drive electrode and the reference electrode through the support members mechanically supporting the vibrator and electrically connected to the vibrator causes the vibrator to vibrate and the piezoelectric layer reacts to the Coriolis force generated in the vibrator, and an angular velocity detection signal is obtained as a signal corresponding to the Coriolis force an an output through the support members mechanically supporting the vibrator and electrically connected to the vibrator.

* * * * *